(12) United States Patent
Shafik et al.

(10) Patent No.: US 12,255,904 B2
(45) Date of Patent: Mar. 18, 2025

(54) EARLY VALIDATION OF COMMUNICATION BEHAVIOR

(71) Applicant: EMC IP Holding Company LLC, Hopkinton, MA (US)

(72) Inventors: Farida Shafik, Cairo (EG); Shary Beshara, Cairo (EG); Michael Estrin, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 17/236,612

(22) Filed: Apr. 21, 2021

(65) Prior Publication Data

US 2022/0345471 A1 Oct. 27, 2022

(51) Int. Cl.
*H04L 9/40* (2022.01)
*G06F 8/60* (2018.01)

(52) U.S. Cl.
CPC ........ *H04L 63/1425* (2013.01); *H04L 63/306* (2013.01); *G06F 8/60* (2013.01)

(58) Field of Classification Search
CPC ...... H04L 63/1425; H04L 63/306; G06F 8/60
See application file for complete search history.

(56) References Cited

U.S. PATENT DOCUMENTS

| | | | |
|---|---|---|---|
| 10,248,533 B1* | 4/2019 | Shah | G06F 11/3006 |
| 10,749,906 B2* | 8/2020 | Rogers | H04L 63/0263 |
| 11,005,867 B1* | 5/2021 | Song | H04W 24/08 |
| 11,151,025 B1* | 10/2021 | Gupta | G06F 11/3688 |
| 11,483,339 B1* | 10/2022 | Kaimal | H04L 63/105 |
| 11,563,758 B2* | 1/2023 | Ahn | H04L 63/0227 |
| 2002/0152061 A1* | 10/2002 | Shimogori | G06F 30/30 703/21 |
| 2004/0205356 A1* | 10/2004 | Maida-Smith | H04L 63/1408 726/14 |
| 2005/0071650 A1* | 3/2005 | Jo | H04L 63/1425 713/188 |
| 2012/0166637 A1* | 6/2012 | White, Jr. | H04L 63/1425 709/224 |
| 2015/0244773 A1* | 8/2015 | Wang | G06F 8/60 709/201 |
| 2016/0054985 A1* | 2/2016 | Cragun | G06F 11/36 715/762 |
| 2017/0149810 A1* | 5/2017 | Keshet | H04L 63/145 |
| 2017/0329583 A1* | 11/2017 | Martinez | G06F 8/433 |
| 2018/0007089 A1* | 1/2018 | Watters | H04L 63/20 |
| 2018/0324204 A1* | 11/2018 | McClory | G06F 9/5027 |
| 2019/0174319 A1* | 6/2019 | Backholm | H04L 63/0281 |
| 2019/0297053 A1* | 9/2019 | Gaddehosur | H04L 61/2592 |
| 2019/0305959 A1* | 10/2019 | Reddy | H04L 9/006 |
| 2020/0073783 A1* | 3/2020 | Hortala | G06F 9/54 |
| 2020/0117434 A1* | 4/2020 | Biskup | G06F 9/445 |

(Continued)

*Primary Examiner* — Han Yang
(74) *Attorney, Agent, or Firm* — Workman Nydegger (57) ABSTRACT

One example method includes extracting an expected communication specification of a service that is in development in a build pipeline, stimulating the service to exercise communication variations of the service, capturing communication traffic involving the service and one or more endpoints, comparing the captured communication traffic to the expected communication specification, and based on the comparing, detecting, in the captured communication traffic, and flagging, any anomalous communication behavior of the service.

20 Claims, 3 Drawing Sheets

(56) References Cited

U.S. PATENT DOCUMENTS

| | | | | |
|---|---|---|---|---|
| 2020/0177638 A1* | 6/2020 | Salman | ................... | H04L 43/50 |
| 2021/0349814 A1* | 11/2021 | Joshi | ................... | G06F 11/3688 |
| 2022/0019515 A1* | 1/2022 | Daniali | ............... | G06F 11/3608 |
| 2022/0294715 A1* | 9/2022 | Agrawal | ................. | H04L 43/04 |

* cited by examiner

EARLY VALIDATION OF COMMUNICATION BEHAVIOR

FIELD OF THE INVENTION

Embodiments of the present invention generally relate to software build pipelines. More particularly, at least some embodiments of the invention relate to systems, hardware, software, computer-readable media, and methods for validating communication behavior of a service in a build pipeline.

BACKGROUND

Various literature has established that the earlier in the software development lifecycle a defect is identified, the more cost-effective and efficient the defect is to correct. A service communicating in an unexpected manner is considered to be a software defect. As such, it is less expensive to correct a defect in a CI (Continuous Integration) build pipeline, where the service being built may contain multiple changes, than in a production deployment where the service is executing, may present an increased threat attack surface, and must be replaced with a version of the service that corrects the defect.

However, it can be difficult to detect anomalous communication behavior. For example, detecting that a service is communicating with external entities outside of the expected communication specification of the service is not trivial. A service must be deployed to an environment that supports the interception and capture of all communication to and from the service. Without direct knowledge of the service implementation, the service must be exercised to cause the occurrence of the full spectrum of service communication variations that would occur in a production environment. This exercising, or testing, should account for differences in the addresses, and number of instances, for example, of the external entities in a development environment versus in a production environment. Further, the external entities the service communicates with must be available, whether as actual or mocked implementations, and must be synchronized to facilitate the exercising of the communication-related behavior of the service. The captured communications must be compared to an expected communication specification to identify anomalies.

Another concern is the typical lack of a known expected communication pattern. Particularly, it is uncommon for a service to have a formal comprehensive specification of the external entities that the service communicates with. This is further complicated by the variation in the addresses, and number of instances, for example, of those external entities across different environments, such as development and production environments for example.

Finally, while developers are becoming more familiar with DevOps (Developer Operations) and CI build pipelines and their role in building software and validating quality, modifying a build pipeline requires substantial effort, which may act as a deterrent for developers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to software build pipelines. More particularly, at least some embodiments of the invention relate to systems, hardware, software, computer-readable media, and methods for validating communication behavior of a service in a build pipeline. In more detail, some example embodiments are directed to validation of service communication behavior early in the software build process by checking for conformance to an expected communication specification in a continuous integration (CI) build pipeline. Among other things, this example approach may identify potential service misbehavior in a build pipeline and reduce the cost of mitigation by, for example, aborting the build process before service artifacts are created and deployed.

In general, some example embodiments of the invention may operate to extract an expected communication specification of a service. The service may then be stimulated to exercise some, or all, possible communication variations that may occur when the service is in operation. Next, all communication traffic of the running service may be captured. The captured communication traffic may then be compared with the expected communication specification. This comparison may enable any anomalous communication behavior to be detected and flagged. Any anomalies may then be resolved before the service is deployed in a production environment, or the build process involving the service may simply be aborted.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that anomalies in the communication behavior of a service may be detected, identified, and resolved, before deployment of the service in a production environment. An embodiment of the invention may help to reduce, or avoid, the costs of fixing software defects. An embodiment of the invention may identify expected communication patterns of a service. An embodiment of the invention may enable ready validation of communication behavior in a build pipeline without imposing an undue burden on developers. An embodiment of the invention may avoid the use of changes to the source code of the service. Various other useful aspects and features of example embodiments are disclosed elsewhere herein.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which the communications operations of a computing service are evaluated. Such evaluations may involve identifying anomalies by examining a wide range of communication behaviors implemented by a service, including how the service interacts with various computing entities. Such evaluations cannot be performed, practically, or otherwise, as a mental process in the mind of a human. Thus, while one or more simplistic examples are disclosed herein, those are only for the purpose of illustration and to simplify the discussion. Accordingly, nothing herein should be construed as teaching or suggesting that any aspect of any embodiment of the invention could or would be performed, practically or otherwise, in the mind of a human.

A. Overview

In general, embodiments of the invention may be employed, for example, in connection with service development pipelines in which services, such as microservices for example, are created by one or more developers. Such services may ultimately be deployed, for example, in computing environments including, but not limited to, cloud computing environments. Some example cloud computing environments include, but are not limited to, Microsoft Azure, Amazon AWS, Dell EMC Cloud Storage Services, and Google Cloud.

By way of introduction, most services must communicate with external entities to achieve the intended purpose(s) of the service. CI build pipelines are a common developer operations (DevOps) pattern used to automate the build, validation, and versioning of service artifacts. Build pipelines are typically composed of individual stages where each stage addresses a specific build concern, for example, running unit tests, or compiling an executable. The build pipelines may be run each time source code changes are introduced into a source code repository for the service that is under development. As well, build pipelines may be used to validate software quality and catch software defect regressions. When a quality issue is identified, the build pipeline can be aborted to ensure defective software artifacts are not created.

The communication specification of a service may include a list of endpoints, where an endpoint may comprise a combination of elements such as a protocol, a domain name, IP address or IP address range, a port number or port number range, and/or any other relevant information. In addition to the list of endpoints, the communication specification of a service may also include one or more indicators as to whether communication with those individual endpoints is allowed or disallowed.

Example embodiments of the invention may enable anomalies in an expected communication pattern of a service to be identified and flagged early in the software development lifecycle. While example embodiments may be incorporated into a CI build pipeline, the application of embodiments of the invention is not so limited. For example, embodiments may be used by a software engineer to analyze a service in their development environment ad-hoc.

B. Aspects of Some Example Embodiments

Some example embodiments of the invention may extend DevOps to include the investigation of communication of services to be able to detect any anomalous communication behavior. Some example embodiments may comprise the following functional aspects: 1—extract the expected communication specification of the service; 2—stimulate the service to exercise all communication variations; 3—capture all the communication traffic of the running service; 4—compare captured traffic to the expected communication specification; and, 5—detect and flag any anomalous communication behavior. In at least some embodiments, these functional aspects may be implemented, for example, inside a CI build pipeline, or in a development environment with minimal knowledge of, interference with, or required changes to, the service undergoing analysis. Thus, example embodiments may reduce the amount of effort and/or knowledge required by a developer to add the invention to a CI build pipeline or exercise it in a development environment.

Figure 1:
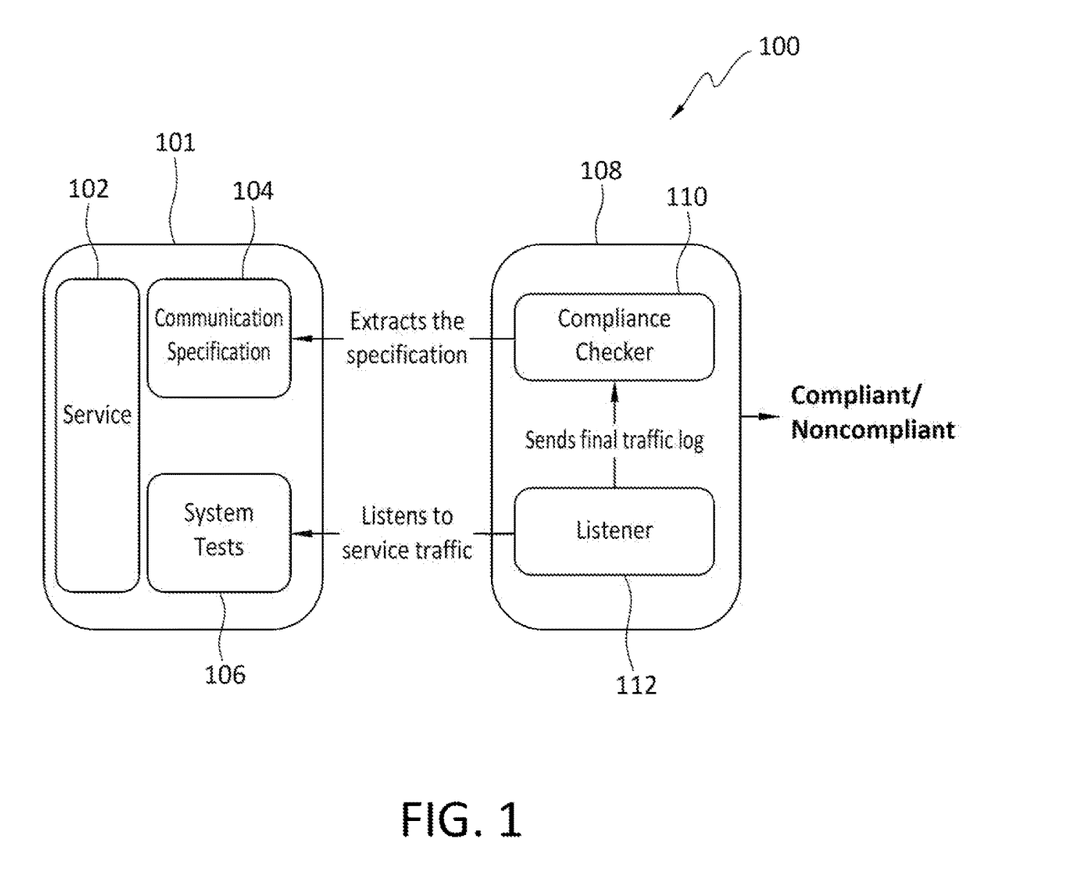
FIG. 1 discloses aspects of an example architecture according to some embodiments.

With reference now to FIG. 1, one example architectural implementation for some example embodiments is denoted generally at 100. As indicated in FIG. 1, a source code repository 101 may include a service 102, and each service 102 may be accompanied by, or packaged with, various components. One such component is an expected communication specification 104 that may describe all expected communications by the service 102, as well as the entities that the service 102 is allowed to interact, that is, communicate, with. Another component that may accompany, or be packaged with, the service 102 is comprehensive system tests 106. In general, the system tests 106 may cause the service 102 to perform its full spectrum of communication variations that would occur in a production environment. If needed, mocked computing entities, which may comprise hardware and/or software, may be employed to simulate computing entities with which the service 102 would be expected to communicate if the service 102 were deployed in the production environment.

Embodiments of the invention may be implemented, and run, as a stage within a CI development pipeline. Example embodiments may be implemented as an evaluation service 108 that includes a compliance checker 110, and a listener 112. The compliance checker 110 may extract the expected communication specification 104 from the service source code repository 101. In some embodiments, the expected communication specification 104 may, but is not required to, be a formatted document such as, for example, a document with a JSON format, or XML format. Some example expected communication specifications 104 may contain one or more communication rules, examples of which include, but are not limited to: network communications protocol; domain name/IP address (range or singular); port number (range or singular); direction of communication origin, that is, whether the service 102 is the source, or recipient, of a communication or communications; and, action(s) to be taken.

After the compliance checker 110 has extracted the communication specification 104, the evaluation service 108 may then wait for the service 102 to run its system tests, and while the system tests are being performed, the listener 112 may listen to, and capture, all inbound and outbound traffic to/from the service 102. When the system tests performed by the service 102 conclude, the evaluation service 108 may compare the logged communications, that is, the inbound and outbound traffic, which may have been stored in a final traffic log of the evaluation service 108, to the expected communication specification 104 to identify any anomalies.

When communication traffic is determined by the compliance checker 110 as failing to meet an established communication rule of the communication specification 104, the action defined in the communication rule may then be taken. For example, if the expected communication specification 104 provides that the service 102 should communicate with a specific IP address, yet the service 102 did not, the action taken may decide whether the pipeline should pass with a warning, or completely fail.

As another example, if the inverse happens, and the service 102 communicates with an endpoint which a stated rule forbids the service 102 to communicate with, the action associated with that rule will decide whether the pipeline should pass with a warning, or completely fail. A default rule may be implemented for any endpoints or other entities not covered by any of the stated rules of the expected communication specification 104, and the action specified in the default rule may determine, for example, how the pipeline will react.

Example embodiments may thus provide for an approach to communications evaluation that may require minimal configuration efforts on the part of the developer. Moreover, example embodiments may avoid the need for any changes to the source code of the service. Instead, the developer may only have to provide an expected communication specification. The learning curve, therefore, required for integration of the functionality provided by example embodiments of the invention may be relatively minor/minimal. Because the evaluation service may be treated as a "black box" with no knowledge, and no knowledge needed, about its internal implementation, the evaluation service may be applied to a variety of services, regardless of their functionality or implementation.

C. Defining Expected Communications of a Service

As noted elsewhere herein, an expected communication specification may include rules defining the expected communications of the service with specific endpoints. The expected communication specification may mandate the communication of the service with some endpoints as necessary, and may deny the communication of the service with other endpoints. Finally, the expected communication specification may identify a default action to be taken with any unlisted endpoints, that is, endpoints for which no rules are in place. Relevant actions to be taken when every rule is not met may also be defined. These considerations are embodied in the following example specification:

```
{
  "Mandated": [ {
    "Protocol": "https"
    "Port": "443"
    "IP": "10.12.12.156"
    "Direction": "Ingress"
```

-continued

```
    "Action": "Fail" //if the service did not communicate with
    this endpoint, fail the pipeline
  },
  {
    "Protocol": "tcp"
    "Port": "8000-8010"
    "IP": "10.12.12.140 - 10.12.12.150"
    "Direction": "Egress"
    "Action": "Warning"
  }],
  "Denied": [ {
    "Protocol": "http"
    "Port": "80"
    "IP": "*.*.*.*" // wildcard to deny all http activity
    "Direction": "Egress"
    "Action": "Fail"
  },
  {
    "Protocol": "ipv4"
    "Port": "6000"
    "IP": "10.12.12.170"
    "Direction": "Egress"
    "Action": "Warning"
  }],
  "Default": "Warning"
}
```

D. Further Discussion

Following is further discussion concerning aspects of some example embodiments. For example, embodiments of the invention may provide for validation of expected communication behavior. Particularly, some example embodiments may validate the behavior of the service by comparing the expected communication by the service to the actual interaction between the service and external entities. By looking for differences between the two, anomalies and potential vulnerabilities may be detected.

As another example, embodiments of the invention may provide for early detection of communication misbehavior. Particularly, by detecting anomalies in the service communication behavior early in the software development lifecycle, the cost of the correction of those anomalies may be decreased.

Further, embodiments of the invention may enable detection of "blind spots" in a expected communication specification. Particularly, conventional tools aim to enforce communication specifications, but overlook the possibility of errors in definition. By testing that the specification is indeed valid and does not face any blind spots, embodiments of the invention may add an extra layer of security and reliability.

As a further example, embodiments of the invention may provide security on the terms of the developer. Particularly, example embodiments include and approach which allows the developer to define the accepted communications, that is, what communications are and are not acceptable, in their own terms and tests. Tests can be written in any language the developer is confident in. This may minimize the possibility of misconfigurations, and consequent misbehavior.

As a final example, embodiments of the invention may operate to validate an expected communication by a service. To illustrate, in order to be able to detect anomalies in the communication of a service, all the traffic to/from the service may be captured. One example of an approach for capturing the inbound and the outbound traffic of a service, without interfering with the source code of the service, is to use a combination of eBPF (extended Berkeley Packet Filter) and a proxy. The eBPF may run programs at the kernel level, but may do so without changing the kernel source code. In example embodiments, the eBPF may be used to intercept the traffic to/from the service, and reroute the intercepted traffic to a proxy which is then responsible for logging the traffic going through it. Then, the logged communication may be compared to the expected communication specification to identify any anomalies.

E. Glossary

Following are various terms that may be employed in this disclosure.

Black box—A system for which there is no knowledge, at least by a developer, of its internal workings.

CI—continuous integration.

Continuous integration—A development practice where developers integrate code into a shared repository frequently, such as several times a day for example. Each integration may then be verified by an automated build and automated tests.

Developer operations (DevOps)—A set of practices that works to automate and integrate the processes between software development and IT teams, so they can build, test, and release. software faster and more reliably.

Endpoint—A communication partner of a service, such as a combination of a protocol; a domain name, IP address or IP address range; a port number or port number range; and any other relevant information.

Service—Software process, application, or program

Threat attack surface—A threat attack surface is the total number of vulnerabilities an unauthorized user can potentially use to access and steal data.

F. Example Methods

Figure 2:
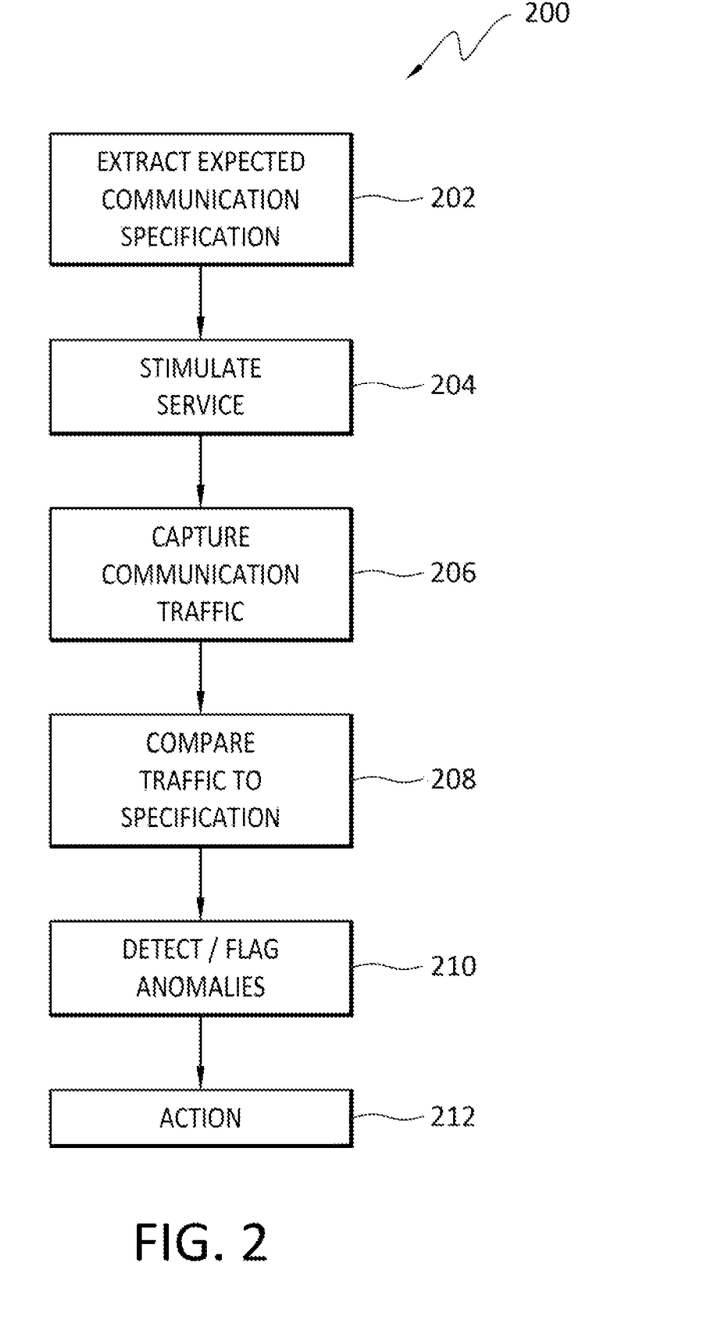
FIG. 2 discloses aspects of a method for identifying and resolving anomalies.

It is noted with respect to the example method of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 2, the example method 200 may be performed in whole or in part by an evaluation service, which may be an element of a development pipeline. The method 200 may begin with extraction 202 of an expected communication specification that is associated with a service that may, or may not, be in development. The extraction 202 may be performed by a compliance checker of an evaluation service, although no particular entity is required to perform the extraction 202.

After extraction 202, the service that is being evaluated may then be stimulated 204 to exercise some, or all, of the communication behaviors specified in the expected communication specification. Any of the communication behaviors may be performed in connection with mocked entities, and/or with production entities.

As the service is communicating with one or more endpoints and/or other entities, traffic between the service and those endpoints and entities may be captured 206, such as by a listener for example. The captured traffic may be stored in a log or other mechanism at the evaluating service, or elsewhere. In some embodiments, all of the traffic may be captured while, in other embodiments, only some of the traffic may be captured. For example, only outgoing traffic from the service may be captured, or only incoming traffic to the service may be captured, or only traffic to and/or from a particular entity, or group of entities, may be captured.

After the traffic of interest has been captured 206, the captured traffic may be compared 208 with the expected communication specification. As a result of the comparison 208, any anomalies in the captured traffic may be detected and flagged 210. Information about the anomalies may be retrievably stored for later reference, such as in a lessons learned database.

Depending upon the outcome of the process 208 and 210, one or more actions may then be taken 212. In some embodiments, the action 212 may be, for example, to abort a build pipeline in which the service under evaluation is being developed, or to resolve an identified anomaly and then re-instantiate the build pipeline with the updated service. The action 212 may be taken before the service under evaluation is deployed to a production environment.

G. Further Example Embodiments

Following are some further example embodiments of the invention. These are presented only by way of example and are not intended to limit the scope of the invention in any way.

Embodiment 1. A method, comprising: extracting an expected communication specification of a service that is in development in a build pipeline; stimulating the service to exercise communication variations of the service; capturing communication traffic involving the service and one or more endpoints; comparing the captured communication traffic to the expected communication specification; and based on the comparing, detecting, in the captured communication traffic, and flagging, any anomalous communication behavior of the service.

Embodiment 2. The method as recited in embodiment 1, wherein the expected communication specification identifies expected communications by the service, and includes one or more communication rules governing communication by the service.

Embodiment 3. The method as recited in any of embodiments 1-2, wherein the method is performed by an evaluation service that is an element of the build pipeline.

Embodiment 4. The method as recited in any of embodiments 1-3, wherein the expected communication specification identifies a network communications protocol, a domain name and/or IP address, a port number, a direction of communication origin, and an action to be taken in the event an anomaly is identified in the captured communication traffic.

Embodiment 5. The method as recited in any of embodiments 1-4, wherein the method is implemented without any change to source code of the service.

Embodiment 6. The method as recited in any of embodiments 1-5, wherein the captured communication traffic is all communication traffic involving the service and one or more endpoints taking place while the service is running the communication variations.

Embodiment 7. The method as recited in any of embodiments 1-6, wherein the anomalous communication behavior comprises failure of the service to communicate with a specified endpoint, and/or communication by the service with a prohibited endpoint.

Embodiment 8. A method for performing any of the operations, methods, or processes, or any portion of any of these, disclosed herein.

Embodiment 9. A non-transitory storage medium having stored therein instructions that are executable by one or more hardware processors to perform operations comprising the operations of any one or more of embodiments 1-8.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
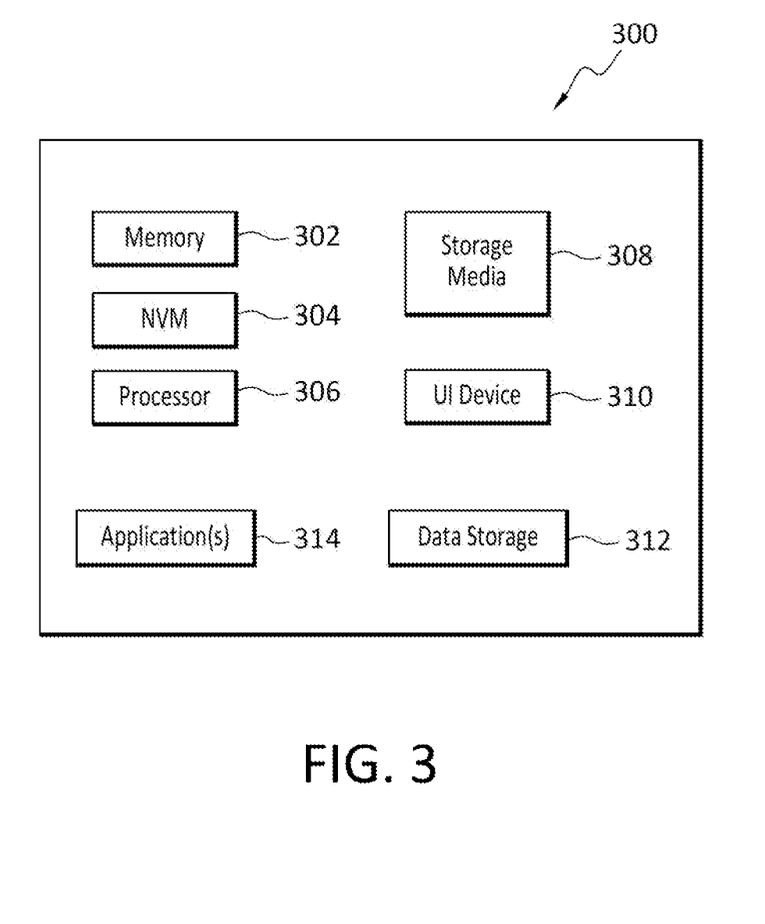
FIG. 3 discloses a computing entity operable to perform any of the claimed methods and processes.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    extracting an expected communication specification of a service, which is in development in a build pipeline, from a source code repository for the service, wherein the build pipeline runs each time source code changes are introduced to the source code repository for the service that is under the development;
stimulating the service to exercise communication variations of the service;
capturing communication traffic involving the service and one or more endpoints by using a packet filter and a proxy, wherein the captured communication traffic is a portion of all the communication traffic involving the service and the one or more endpoints, and the packet filter runs at a kernel level to intercept the communication traffic and reroute the intercepted communication traffic to the proxy, which logs the intercepted communication traffic as the captured communication traffic;
comparing the captured communication traffic to the expected communication specification; and
based on the comparing, detecting, in the captured communication traffic, and flagging, any anomalous communication behavior of the service.

2. The method as recited in claim 1, wherein the expected communication specification identifies expected communications by the service, and includes one or more communication rules governing communication by the service.

3. The method as recited in claim 1, wherein the method is performed by an evaluation service that is an element of the build pipeline.

4. The method as recited in claim 1, wherein the expected communication specification identifies a network communications protocol, a domain name and/or IP address, a port number, a direction of communication origin, and the action to be taken in the event an anomaly is identified in the captured communication traffic.

5. The method as recited in claim 1, wherein the method is implemented without any change to source code of the service by the packet filter.

6. The method as recited in claim 1, wherein the captured communication traffic is outgoing traffic from the service, incoming traffic to the service, or traffic to and/or from a particular entity or group of entities taking place while the service is running the communication variations.

7. The method as recited in claim 1, wherein the anomalous communication behavior comprises failure of the service to communicate with a specified endpoint, and/or communication by the service with a prohibited endpoint.

8. A computer readable storage medium having stored therein instructions that are executable by one or more hardware processors to perform operations comprising:
extracting an expected communication specification of a service, which is in development in a build pipeline, from a source code repository for the service, wherein the build pipeline runs each time source code changes are introduced to the source code repository for the service that is under the development;
stimulating the service to exercise communication variations of the service;
capturing communication traffic involving the service and one or more endpoints by using a packet filter and a proxy, wherein the captured communication traffic is a portion of all the communication traffic involving the service and the one or more endpoints, and the packet filter runs at a kernel level to intercept the communication traffic and reroute the intercepted communication traffic to the proxy, which logs the intercepted communication traffic as the captured communication traffic;
comparing the captured communication traffic to the expected communication specification; and
based on the comparing, detecting, in the captured communication traffic, and flagging, any anomalous communication behavior of the service.

9. The computer readable storage medium as recited in claim 8, wherein the expected communication specification identifies expected communications by the service, and includes one or more communication rules governing communication by the service.

10. The computer readable storage medium as recited in claim 8, wherein the computer readable storage medium is performed by an evaluation service that is an element of the build pipeline.

11. The computer readable storage medium as recited in claim 8, wherein the expected communication specification identifies a network communications protocol, a domain name and/or IP address, a port number, a direction of communication origin, and the action to be taken in the event an anomaly is identified in the captured communication traffic.

12. The computer readable storage medium as recited in claim 8, wherein the computer readable storage medium is implemented without any change to source code of the service by the packet filter.

13. The computer readable storage medium as recited in claim 8, wherein the captured communication traffic is outgoing traffic from the service, incoming traffic to the service, or traffic to and/or from a particular entity or group of entities taking place while the service is running the communication variations.

14. The computer readable storage medium as recited in claim 8, wherein the anomalous communication behavior comprises failure of the service to communicate with a specified endpoint, and/or communication by the service with a prohibited endpoint.

15. A system, comprising:
one or more hardware processors; and
a computer readable storage medium having stored therein instructions that are executable by the one or more hardware processors to perform operations comprising:
extracting an expected communication specification of a service, which is in development in a build pipeline, from a source code repository for the service, wherein the build pipeline runs each time source code changes are introduced to the source code repository for the service that is under the development;
stimulating the service to exercise communication variations of the service;
capturing communication traffic involving the service and one or more endpoints by using a packet filter and a proxy, wherein the captured communication traffic is a portion of all the communication traffic involving the service and one or more endpoints, and the packet filter runs at a kernel level to intercept the communication traffic and reroute the intercepted communication traffic to the proxy, which logs the intercepted communication traffic as the captured communication traffic;
comparing the captured communication traffic to the expected communication specification; and
based on the comparing, detecting, in the captured communication traffic, and flagging, any anomalous communication behavior of the service.

16. The system as recited in claim 15, wherein the expected communication specification identifies expected communications by the service, and includes one or more communication rules governing communication by the service, and the expected communication specification identifies a network communications protocol, a domain name and/or IP address, a port number, a direction of communication origin, and the action to be taken in the event an anomaly is identified in the captured communication traffic.

17. The system as recited in claim 15, wherein the system is performed by an evaluation service that is an element of the build pipeline.

18. The system as recited in claim 15, wherein the system is implemented without any change to source code of the service by the packet filter.

19. The system as recited in claim 15, wherein the captured communication traffic is outgoing traffic from the service, incoming traffic to the service, or traffic to and/or from a particular entity or group of entities taking place while the service is running the communication variations.

20. The system as recited in claim 15, wherein the anomalous communication behavior comprises failure of the service to communicate with a specified endpoint, and/or communication by the service with a prohibited endpoint.

* * * * *